United States Patent

Bringolf

Patent Number: 5,355,643
Date of Patent: Oct. 18, 1994

[54] TRANSFORMABLE STRUCTURAL ELEMENT

[75] Inventor: Serge Bringolf, La Chaux-de-Fonds, Switzerland

[73] Assignee: Alain Burri SA, Conches/Geneve, Switzerland

[21] Appl. No.: 895,332

[22] Filed: Jun. 8, 1992

[30] Foreign Application Priority Data

Oct. 4, 1991 [CH] Switzerland ....... PCT/CH91/00208

[51] Int. Cl.⁵ ............................................. E04H 12/18
[52] U.S. Cl. ....................................... 52/108; 52/723; 24/418
[58] Field of Search ................. 52/108, 111, 117, 118, 52/723; 49/325; 24/418, 406

[56] References Cited

U.S. PATENT DOCUMENTS

| | | | |
|---|---|---|---|
| 1,834,900 | 12/1931 | Holmes | 52/108 |
| 2,184,747 | 12/1939 | Levai | 52/108 |
| 2,375,461 | 5/1945 | Bender | 52/108 |
| 2,574,657 | 11/1951 | Pierce | 52/108 |
| 3,012,635 | 12/1961 | Blain | 52/108 |
| 3,805,462 | 4/1974 | Caperton | 52/108 |
| 3,823,446 | 7/1974 | Labecki | 24/418 |
| 4,562,622 | 1/1986 | Takabatake | 24/415 |
| 5,056,278 | 10/1991 | Atsukawa | 52/108 |

FOREIGN PATENT DOCUMENTS

| | | | |
|---|---|---|---|
| 1425887 | 12/1966 | France | 52/108 |
| 1141257 | 1/1969 | United Kingdom . | |

Primary Examiner—Carl D. Friedman
Assistant Examiner—Winnie Yip
Attorney, Agent, or Firm—Weil, Gotshal & Manges

[57] ABSTRACT

A structural element is disclosed which is substantially composed of a linked chain and of a flexible connection which can be a chain of identical links and which can be assembled together as required to form a rigid beam. The linked chain comprises opposing support points, the first support point of one link of row n of the chain cooperating with the second support point of a link of row n−1 to contain, while the element is being rendered rigid, hooking elements integral with the flexible connection and which, in the preferred embodiment of the invention, are the pins of the second chain. The structural element can be assembled or disassembled using a special device.

14 Claims, 8 Drawing Sheets

TRANSFORMABLE STRUCTURAL ELEMENT

FIELD OF THE INVENTION

The present invention relates toga transformable structural element capable of assuming the shape of a beam to support a load and/or transmit a force and/or a couple. This shape can be obtained as desired by the user from components of the structural element each having, when they are not assembled, a substantially flexible configuration.

A structural element of this kind can be used in numerous applications to permit the selective formation of a structural element capable of supporting a load and/or transmitting a force and/or a couple and having a specific length, the element being capable of being retracted into a volume, the space of which is very much reduced in relation to this length.

More precisely, but solely by way of example, an element of this type can form a flagstaff of a given height that can be retracted into a housing provided in the ground when the flag is not being flown.

OBJECTS OF THE INVENTION

It is therefore an object of the instant invention to provide a transformable structural element lending itself easily to mechanization of its transformation and capable of supporting substantial loads by the use of two or more units.

BRIEF SUMMARY OF THE INVENTION

The invention thus provides a transformable structural element capable of assuming a beam-like shape which comprises a first chain, the links of which mutually articulate and each comprise a hinge pin and at least one link plate and means for selectively rendering the articulations between the links rigid to transform it into a beam-like structure, said means for rendering rigid comprising a flexible connection having a series of locking elements with a fixed distance therebetween and where the plate of one link of said chain defines a first support point and a second support point opposing the first support point, the first support point of the link of row n cooperating with the second support point of the link of row n-1 to contain a locking element of said flexible connection when the structural element assumes its beam-like shape.

As a result of these features, the structural element can be used to selectively provide a rigid beam starting from a configuration in which the components of the element can occupy a different volume from that occupied by the element when it is rigid. In a specific case, this space can enter into a volume, the dimension of which in the direction in which the rigid beam has to extend is very small compared to the length of this beam. In addition, the structural element makes it easily possible to choose the length of the beam to the extent that these components can be assembled along a shorter or longer length.

The assembly of the structural element can easily be mechanised since the flexible connection which renders the linked chain rigid can be assembled in step with the progression of the length of the beam that is rendered rigid. In addition, the linked chain can easily be reinforced by placing several plates side by side for each articulated link on a same pin, the flexible connection capable of being assembled onto all the plates of each link by means of one locking element of this connection common to all the plates of a same link of the chain.

BRIEF DESCRIPTION OF THE DRAWINGS

Other characteristics and advantages of the invention are given in the following description of non-limiting embodiments with reference to the appended drawings, in which.

DETAILED DESCRIPTION OF THE INVENTION

Figure 1:
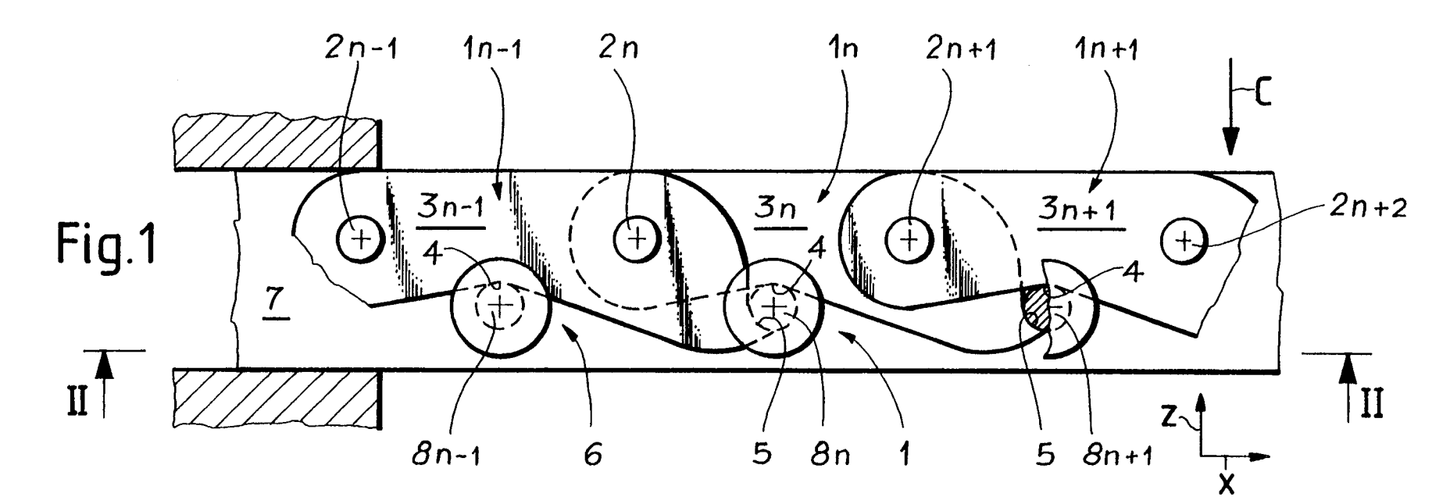
FIG. 1 is a partial sectional view of a structural element of the invention in its rigid configuration and in its most elementary embodiment.
Figure 2:
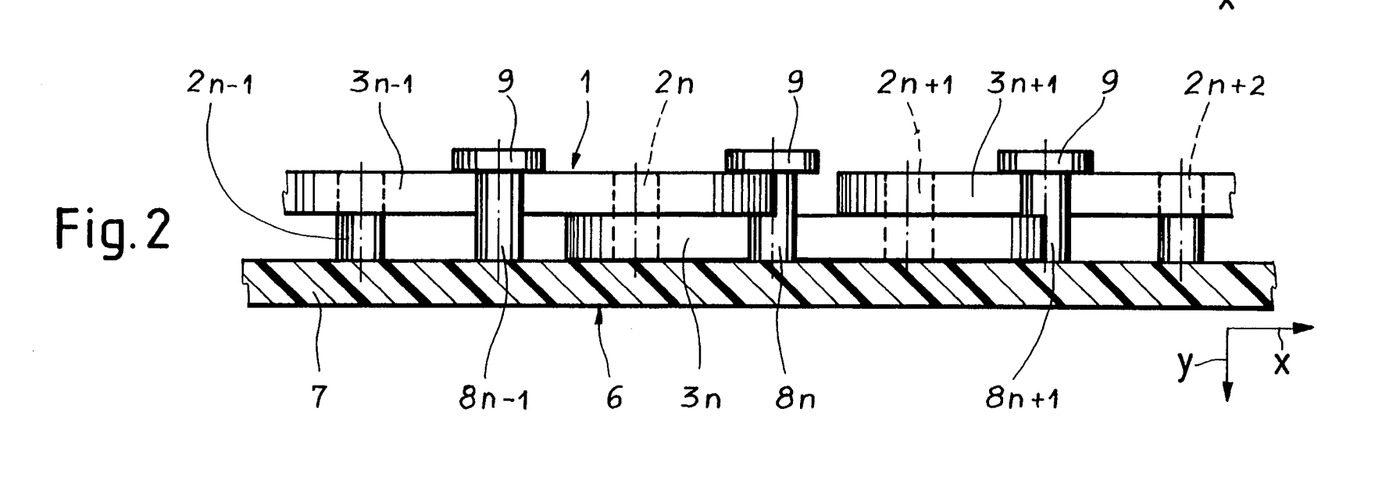
FIG. 2 is a sectional view along the line II—II of FIG. 1.

Reference is made first of all to FIGS. 1 and 2 which illustrate both the basic principle of the invention and its simplest embodiment.

Here the structural element comprises a linked chain 1, three links of which are shown here, namely the links ... $1n-1$, $1n$, $1n+1$ ..., it being possible for the chain to have as many links as necessary.

The links are articulated in relation to one another by means of pins ... $2n-1$, $2n$, $2n+1$ ... which can be fabricated in any appropriate manner provided the links are kept laterally together and of course also able to withstand the loads imposed on the element once this has been rendered rigid. In the present embodiment, the pins can for example be made in the form of an internally threaded sleeve and provided with a radial flange, this sleeve receiving a locking screw.

Each link has a plate ... $3n-1$, $3n$, $3n+1$ ... having a first lateral support point 4 which is in this case situated in a depression of one of the sides of the plate, as well as a second lateral support point 5 defined by a hooked part provided at one of the extremities of each plate. As shown in FIG. 1, when the structural element is assembled, the first support point 4 of any link n of the chain 1 is situated facing the second support point 5 of the link of row $n-1$ of the chain. The cooperating support points of two successive links in the chain are thus in opposing positions.

The structural element also comprises a flexible connection 6 formed here of a band 7 on which are provided at different points cylindrical studs, ... $8n-1$, $8n$, $8n+1$ ... extending perpendicularly from one of the lateral faces of the band, that is the one which, when the structural element is assembled, is located adjoining the linked chain 1. As a result, the pins of these studs extend parallel to the pins of the links of the chain I when the structural element assumes its beam-like shape. The flexible connection can, for example, be a reinforced rubber band.

Each stud . . . $8n-1$, $8n$, $8n+1$ . . . is provided with an end flange 9 (FIG. 2) adapted to lock the chain laterally after assembly and thus to consolidate the structural element. The distance between the studs 9 is the same as between the pins . . . $2n-1$, $2n$, $2n+1$ . . .

It follows from the foregoing description that the structural element of the invention can adopt two configurations, namely a flexible configuration in which the chain 1 and the flexible connection 6 are disassociated and another configuration in which the element constitutes a rigid beam depending on the way in which its two components are assembled. In this rigid configuration the element is able to withstand a load/or transmit a force and/or a couple.

To explain the operation and to simplify the description (FIGS. 1 and 2), it should be noted that the structural element is assembled and positioned within a system of orthogonal coordinates x—y—z, the axis z of which is vertically oriented and the axis x is directed along the length of the beam which constitutes the structural element.

Both the chain 1 and the flexible coupling 6 can be rolled up, for example on a suitable drum, from which they are unrolled to assemble the structural element. The chain 1 can obviously be rolled around a drum, the axis of which is oriented along the direction y, that is parallel to that of the pins . . . $2n-1$, $2n$, $2n+1$ . . .

In the case of the flexible connection 6, it will firstly be understood that it can have a very low mechanical resistance in both directions y and z; under these conditions it can be made of a band of completely flexible material. Nonetheless, the beam formed by the structural element would then only have a specific mechanical resistance in the direction z, the forces of stress C being directed downwards. The beam would then therefore be able to support a load provided this was compatible with the resistance of the chain. On the other hand, if this load C acts in the opposite direction, the beam would not present any resistance since the structural element would be disassembled immediately. It should be noted here that the structural element is constrained at its extremity, as shown to the left of FIG. 1.

However, if the connection 6 is only laterally flexible, that is if it can be rolled around a drum the axis of which is vertically oriented (direction z), the structural element would then present a resistance to flexion in both directions along the direction z, provided of course that the load limits are not exceeded. It will be seen hereinbelow that in other embodiments of the invention the flexible connection 6 will be made in a different manner to give the structural elements resistance properties that are identical for the two orientations of the load along the axis Z.

It will also be noted that the studs . . . $8n-1$, $8n$, $8n+1$ . . . ultimately serve to lock the articulations between the links of the chain 1.

It should be noted that the orientation of the structural element described hereinabove in the system of coordinates x—y—z is solely selected for purposes of illustration, the structural element having entirely analogous properties, regardless of its orientation in space.

FIGS. 3 to 8 show the preferred embodiment of the invention. In this case, the structural element is also composed of a linked chain 10 and a flexible connection 11, where these two components have exactly the same shape. In other words, the flexible connection 11 is also composed of a linked chain identical in all points to the chain 10. For this reason only the chain 10 will be described in greater detail below.

Figures 3, 6, 7, 8:
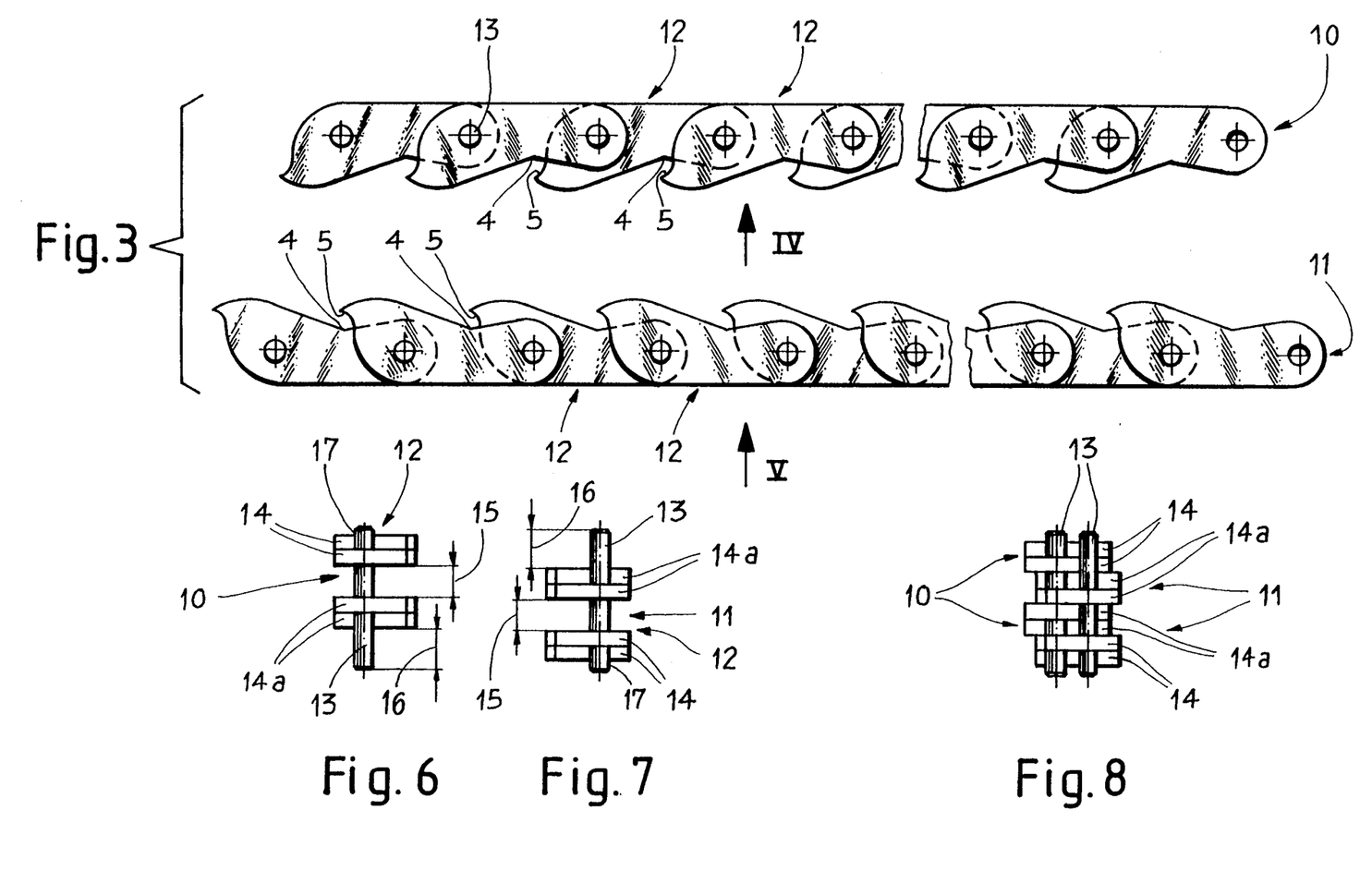
FIG. 3 shows a preferred embodiment of a structural element of the invention, the linked chain and the flexible connection (here also a linked chain) being shown separately.
FIGS. 6 and 7 show views along arrows VI and VII respectively of FIGS. 4 and 5.
FIG. 8 shows the end of the assembled element.
Figure 4:
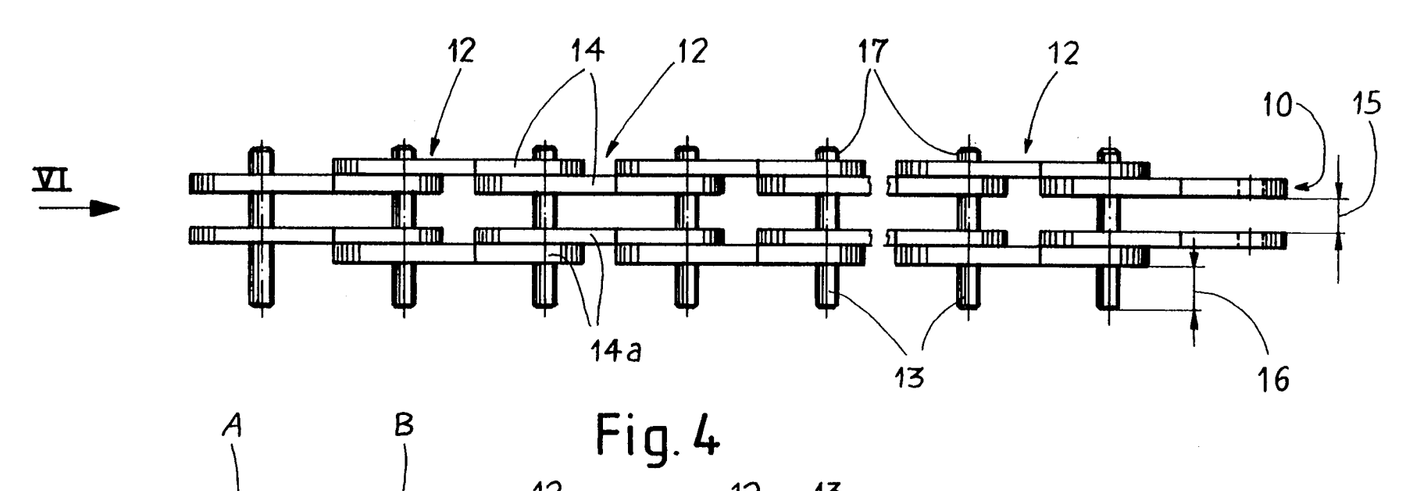
FIGS. 4 and 5 are profile views along the arrows IV and V of FIG. 3.
Figure 5:
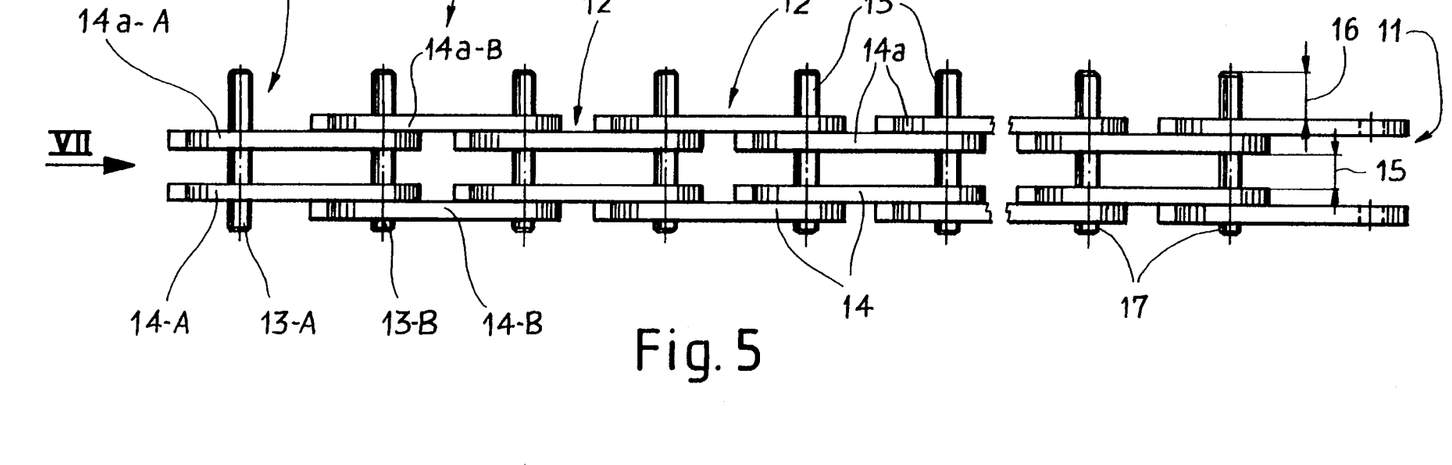

More specifically, the chain 10 comprises a succession of links 12 each comprising a pin 13 and at least one plate 14. In the embodiment shown, each plate 14 is arranged alongside an identical parallel plate 14s, an interspace 15 being provided between the plates forming the narrowest links. In addition, each plate has two points of support 4 and 5, as shown in the embodiment of FIGS. 1 and 2.

The interspace 15 provided on the pin of each linked chain 10 or 11 is equal to the thickness of the two plates 14 or 14a so that when the two chains are assembled to form the structural element, they are interleaved with one another (see FIG. 8) to form a coherent assembly. It will be noted that for the same purpose the pins 13 are extended on one side of each chain over a distance 16 equal to the interspace 15, plus a very small length by which the axle projects on the other side of the chain.

In addition, the pins 13 also project by a small distance beyond the opposing lateral face of each chain to form guide members 17 the purpose of which will be explained below.

When the structural element is in its non-assembled shape, the chains 10 and 11 have a flexibility oriented in such a way that their links are freely articulated about the pins 13. The pins 13 are nonetheless axially locked each time in aligned holes of the two plates of a same link respectively. Considering FIG. 5 (left hand side), the plates 14-A and 14a-A of the link are rotatably integral about the pin 13-A of this link whereas these same plates turn freely about the pin 13-B of the link B,. the plates 14-B and 14a-B of which are rotatably integral with the pin 13-B and so on, along the entire length of the chain.

This means that each chain can be rolled around a drum the axis of rotation of which is parallel to the pins 13. It is therefore simple to retract the two chains in a reduced space the perpendicular dimension of which to the pins of the chains is small in relation to the length of the structural element when this is in its assembled configuration.

This may easily be achieved by hand by progressively hooking the links of the chains 10 and 11 to one another, while at the same time interleaving them as shown in FIG. 8. In this configuration the structural element is very robust and virtually becomes a single beam. The loads which can be supported by this element are obviously a function of the materials used and the dimensioning of the parts. Moreover, the robustness can easily be increased by providing links formed of plurality of parallel plates, the distances between which are selected to obtain an interlacing of the two chains as shown in FIG. 8.

Figure 9:
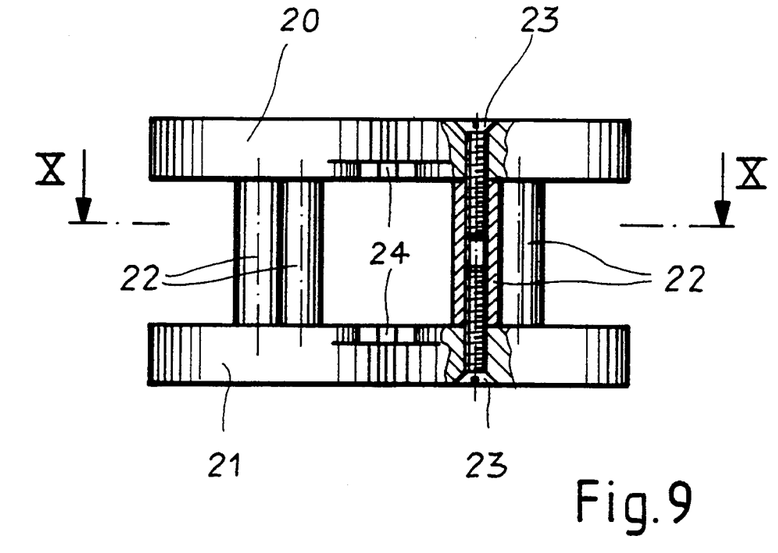
FIG. 9 is a partially sectional front view of an assembly device for a structural element of the invention.
Figure 10:
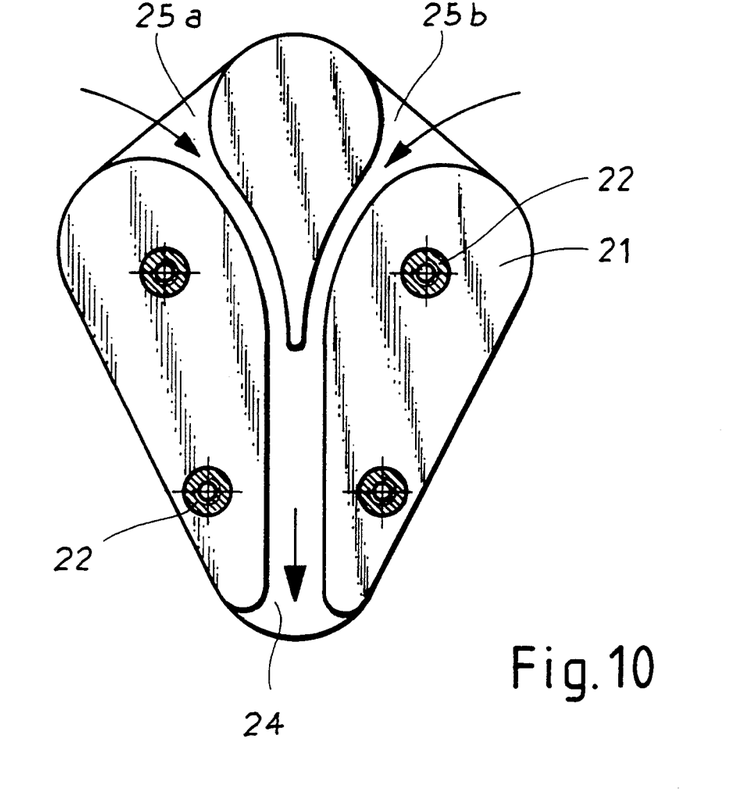
FIG. 10 is a view along the line X—X of FIG. 9.

To facilitate the mode of assembly it is possible to use an assembly device, one embodiment of which has been shown in FIGS. 9 and 10.

The assembly device comprises two plates 20 and 21 secured by four small columns 22 and fixed to one another by screws 23. The opposing faces of the two plates 20 and 21 each present a guide channel 24 into both sides of which two junction channels 25a and 25b terminate. These channels are designed to guide the ends 17 of the pins of the two chains 10 and 11 forming the structural element of the preferred embodiment of FIGS. 3 to 8.

Figure 11:
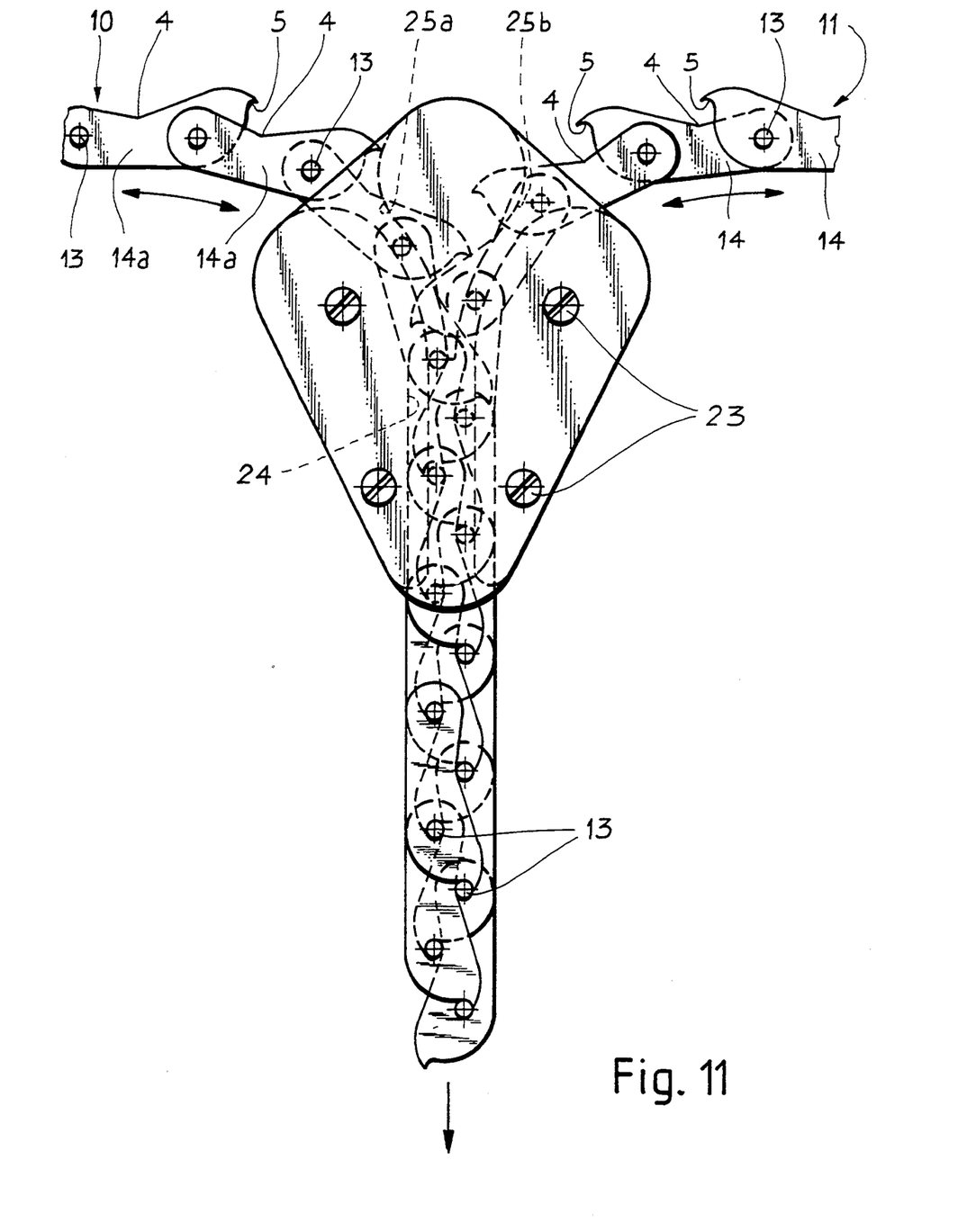
FIG. 11 shows the structural element in the course of assembly using the assembly device.

FIG. 11 illustrates how assembly is effected using the assembly device of FIGS. 9 and 10. The two chains 10 and 11 are introduced between the plates 20 and 21, the outer faces of the outer plates of their links sliding on the opposing faces of the plates 20 and 21. The pins of the links are then guided into the channels 25a and 25b with regard to chains 10 and 11 respectively and then assembled in the common guide channel 24.

During the relative movement of the chains 10 and 11, on the one hand, and the assembly device on the other, the links of the chains are progressively hooked into One another in such a way that the structural element becomes a rigid beam on emerging from the device.

Figure 12:
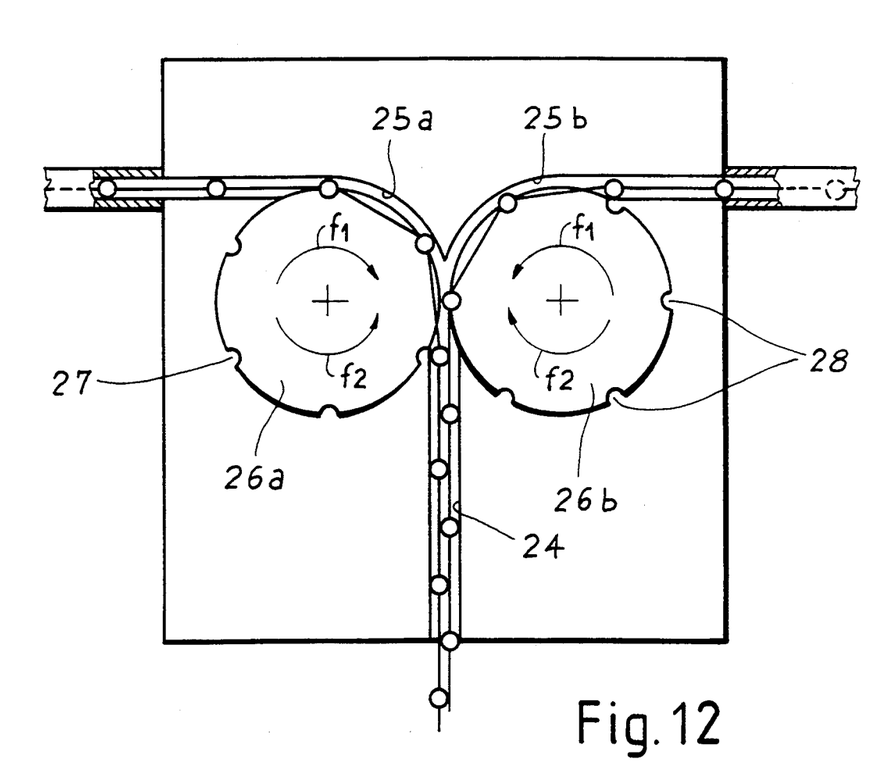
FIGS. 12 and 13 show diagrammatically a motor device facilitating the automatic assembly of the structural element of the invention.
Figure 13:
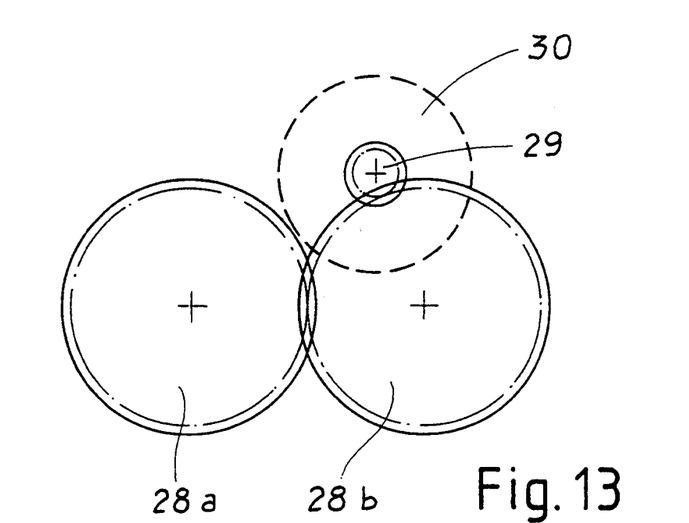

FIGS. 12 and 13 show on the basis of skeleton diagrams how the assembling and disassembling operations of the structural element can be effected.

FIG. 12 relates to an assembly, the principle of which is similar to the device of FIGS. 9 and 10. However, in this case, the channels 24 and 25a, 25b are flanked by chain wheels 26a and 26b, the indentations 27 of Which are designed to retain the extremities 17 of the pins 13 of the linked chains 10 and 11.

By turning the chain wheels 26a and 26b in one or other direction it is possible to achieve the assembly (arrow f1) or disassembly (f2) of the structural element.

FIG. 13 shows a motorized example of this assembly device. Each chain wheel 26a, 26b is rotatably integral with a toothed wheel 28a, 28b which mesh with one another and with a motor pinion 29 coupled to a motor 30. It is of course also possible to drive the pinion 20 using a handle.

Figure 14:
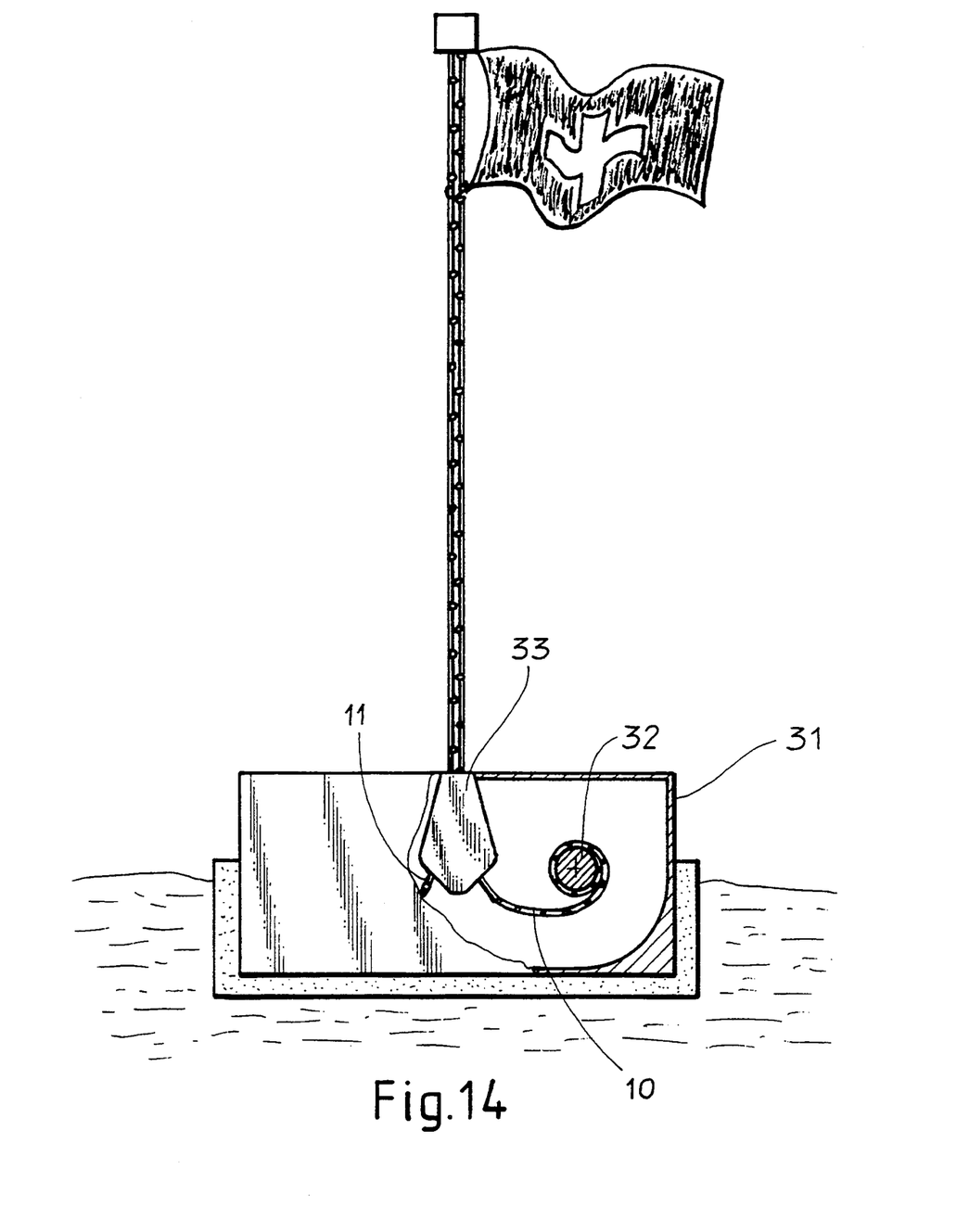
FIGS. 14 and 15 show by way of example two practical applications of the structural element of the invention.
Figure 15:
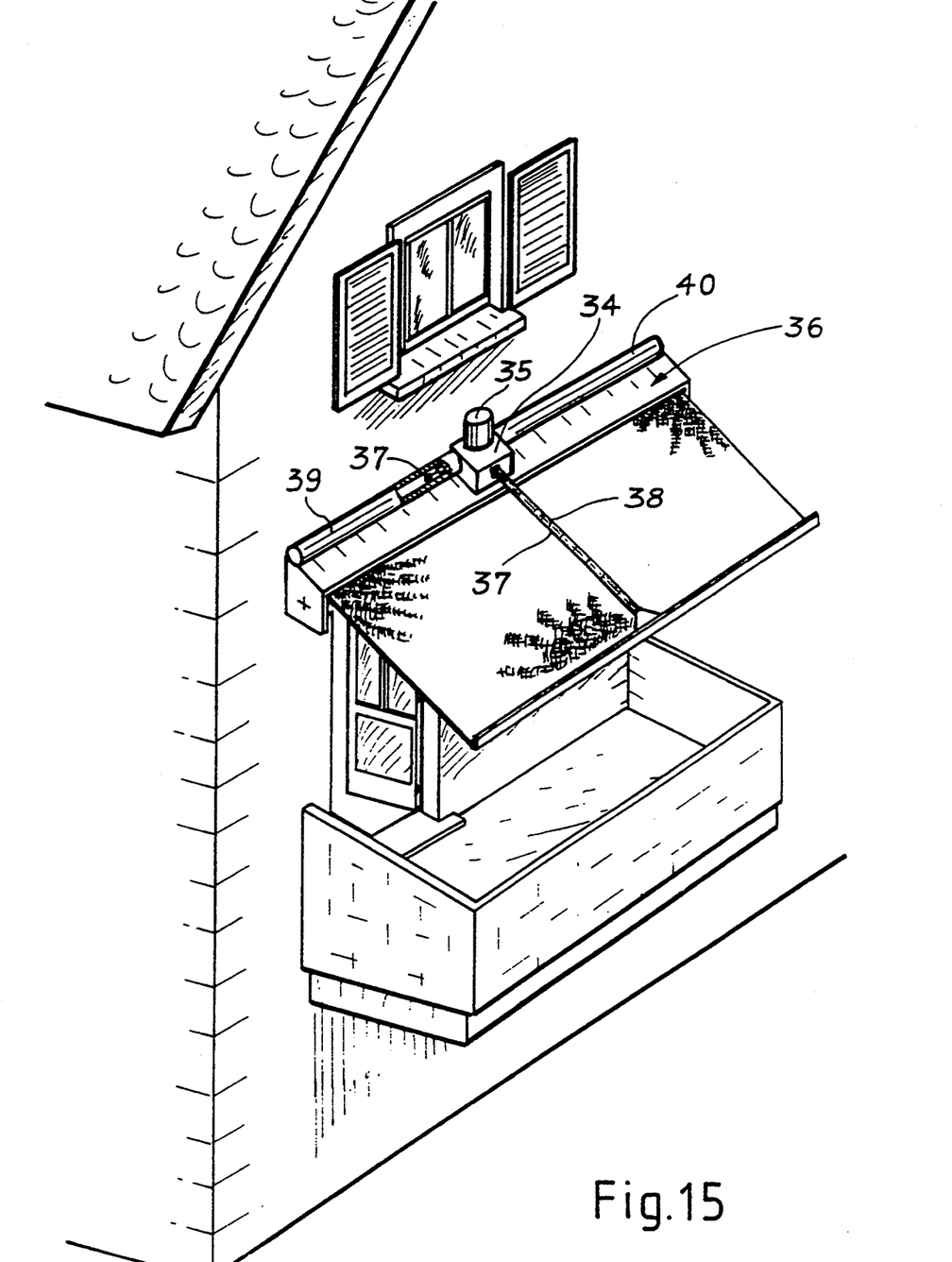

FIGS. 14 and 15 show two applications of the invention in diagrammatic form.

FIG. 14 shows a flagstaff which can be retracted into a box 31 embedded in the ground. The box contains two drums 32 about which are rolled the linked chains 10 and 11 respectively. An assembly device 33 analogous to that shown in FIG. 12 and associated with the motor device shown in FIG. 13 is placed between the drums.

FIG. 15 shows the application of the invention to a sun blind adapted to be mounted, for example, to the facade of a building. An assembly device 34 provided with its motor device 35 is mounted in the middle of a frame 36 into which the blind can be rolled up. The linked chains 37 and 38 of the structural element are housed in sheaths 39 and 40 placed above the frame 36. When the blind needs to be unrolled, the structural element is assembled to form, on emerging from the assembly device, a horizontal beam which makes it possible to stretch the blind. It suffices of course to reverse the direction of rotation of the motor device 35 to retract the blind and disassemble the structural element. Various other applications hereof are obviously also possible.

Finally, it will be noted that the beam obtained after assembly of the structural element does not necessarily need to be rectilinear. An element of this kind could, in fact, be designed of rigid structure, but curved to a greater or lesser extent by carefully choosing different lengths for the links of the chain.

I claim:

1. A transformable structural element capable of assuming the shape of a beam-like structure having first and second lateral sides and which comprises a first chain also having two lateral sides, a first one of which corresponds to the first one of said lateral sides of said structural element, said first chain comprising a series of articulated links, each of said links comprising at least one link plate and a hinge pin joining a link plate of an adjacent link and projecting from both sides of the joined link plates, said element further comprising means for selectively stiffening the articulations between said links to transform said element into a beam-like structure, said means for selectively stiffening said articulations comprising an elongated flexible connecting member having two lateral sides, a first one of the lateral sides corresponds to the second one of said lateral sides of said structural element, said flexible connection further comprising a series of locking elements equally spaced apart along said elongated flexible connection, the link plate of each of said links of said chain including a first support surface and second support surface opposing said first support surface, the first support surface of each of said links cooperating respectively with the second support surface of one of its adjacent links to contain a respective one of said locking elements therebetween when said structural element assumes its beam-like shape, and wherein the hinge pins of said links and said locking elements of said flexible connecting member are laterally accessible from said first sides of said chain and said flexible connection during the assembly of the chain and flexible connecting member into a beam-like structure, in a direction substantially perpendicular to the axes of said hinge pins and said locking elements.

2. A structural element according to claim 1, wherein the locking elements of said flexible connection are formed by pins extending parallel to said hinge pins when the element assumes its beam-like shape.

3. An element according to claim 1, where said first support surface is formed in the plate of each link by a depression provided in its edge and where said second support surface is formed by a hooked part provided at the extremity of each plate, the hooked part containing the corresponding locking element of said flexible connecting member during assembly of the structural element.

4. A structural element according to claim 1, wherein said flexible connecting member comprises a band to which said locking elements are fixed at different points.

5. A structural element according to claim 4, wherein each locking element terminates in an outer radial flange for retaining said chain laterally when the structural element assumes its beam-like shape.

6. A structural element according to claim 1, wherein said flexible connection is a second chain identical to the first chain and wherein said locking elements of the flexible connection are formed by the hinge pins of the links of the second chain.

7. A structural element according to claim 1, wherein each link of said first chain comprises a plurality of parallel plates mounted together on the pin of such link.

8. A structural element according to claim 6, wherein in each link of said first and second chains said plates are mounted on the corresponding pin with a constant predetermined distance between the pins of adjacent links, and wherein the first and second chains are interleaved lengthwise when the structural element assumes its beam-like shape.

9. A structural element according to claim 6, wherein the pins of all the links of the first and second chains project laterally on one side thereof to form guide members.

10. An assembling apparatus in combination with the transformable structural element of claim 1 for assembling and disassembling said structural element, said apparatus comprises joining means to join said first linked chain and said flexible connection and guide means defined by said junction means to progressively contain or release each locking element of said flexible connection in relation to the first and second support surfaces of two respective consecutive links of said first chain.

11. An apparatus according to claim 10, which also comprises receiving means placed in front of said junction means for receiving said first chain and said flexible connection when the structural element assumes its flexible configuration.

12. An apparatus according to claim 10, which also comprises motor means coupled to said chain and to said flexible connection to ensure their automatic assembly and disassembly.

13. An apparatus according to claim 12 for a structural element such as defined in claim 6, wherein said motor means comprise a drive motor and toothed driving wheels coupled to this motor and meshing with the first and second chains respectively of said structural element.

14. A transformable structure for forming a extendable beam-like structure comprising a pair of mating chains each including a series of articulated links, each of said links including a spaced-apart pair of planar side plates and first and second axles extending between and supporting said pair of side plates, said first axle further being the second axle of the proceeding link of said chain, said second axle also being the first axle of the succeeding link of said chain, the side plates of every other of said links being disposed outside the said plates of the link intermediate thereto, each of said side plates including a first and a second supporting surface on opposed sides of said side plate, said first support surface of each side plate of a link cooperating with the second support surface of the corresponding side plate of the succeeding link of the chain for forming a pair of co-acting jaws for containing an axle of the other chain therebetween, said chains interlacing with said first and second supporting surfaces of each chain facing the other, and with the co-acting jaws formed by each successive pair of links grasping successive axles of the other chain to form a substantially rigid beam-like structure.

* * * * *